US012621644B2

(12) United States Patent
Soldano et al.

(10) Patent No.: US 12,621,644 B2
(45) Date of Patent: May 5, 2026

(54) WIRELESS ACCESSORY ADVERTISEMENTS

(71) Applicant: Apple Inc., Cupertino, CA (US)

(72) Inventors: Marco Soldano, Cupertino, CA (US); Shawn G. Fink, Cupertino, CA (US); Anita G. Desai, Cupertino, CA (US); Antonio R. De Lima Fernandes, Cupertino, CA (US); Siva Ganesh Movva, Cupertino, CA (US); Ariane Cotte, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 460 days.

(21) Appl. No.: 17/715,164

(22) Filed: Apr. 7, 2022

(65) Prior Publication Data

US 2022/0353666 A1      Nov. 3, 2022

Related U.S. Application Data

(60) Provisional application No. 63/182,661, filed on Apr. 30, 2021.

(51) Int. Cl.
| | |
|---|---|
| *H04W 8/00* | (2009.01) |
| *H04W 72/20* | (2023.01) |
| *H04W 76/14* | (2018.01) |

(52) U.S. Cl.
CPC ........... *H04W 8/005* (2013.01); *H04W 72/20* (2023.01); *H04W 76/14* (2018.02)

(58) Field of Classification Search
CPC ...... H04W 8/005; H04W 76/14; H04W 72/20
USPC ....................................................... 455/41.2
See application file for complete search history.

(56) References Cited

U.S. PATENT DOCUMENTS

| | | | | |
|---|---|---|---|---|
| 8,559,872 | B2 * | 10/2013 | Butler | H04B 5/266 455/127.1 |
| 8,909,217 | B2 * | 12/2014 | Baldini | H04H 20/62 455/3.03 |
| 8,971,804 | B2 * | 3/2015 | Butler | G11C 5/142 455/127.1 |
| 9,451,391 | B1 * | 9/2016 | Brenner | H04W 8/005 |
| 11,026,083 | B2 * | 6/2021 | Giles | H04W 24/04 |
| 2010/0189268 | A1 * | 7/2010 | Haartsen | H04R 1/10 381/56 |

(Continued)

FOREIGN PATENT DOCUMENTS

| | | |
|---|---|---|
| CN | 111697713 | 9/2020 |
| CN | 112332499 | 2/2021 |

(Continued)

OTHER PUBLICATIONS

Extended European Search Report in European Appln. No. 22168212. 3, dated Sep. 21, 2022, 8 pages.

(Continued)

*Primary Examiner* — April G Gonzales
(74) *Attorney, Agent, or Firm* — Fish & Richardson P.C.

(57) ABSTRACT

Systems, methods, devices and non-transitory, computer-readable storage mediums are disclosed for identifying, by a processor of a wireless device that is coupled with a charging case, an enable command received from the charging case; and transmitting, by the processor based on the enable command, an advertisement signal that includes information related to an identification of the wireless device.

20 Claims, 8 Drawing Sheets

(56) References Cited

U.S. PATENT DOCUMENTS

| | | | | |
|---|---|---|---|---|
| 2013/0021957 A1* | 1/2013 | Fang | H04W 8/186 | 370/311 |
| 2013/0288600 A1* | 10/2013 | Kuusilinna | H02J 50/12 | 455/41.2 |
| 2014/0213186 A1* | 7/2014 | Gage | H04W 8/005 | 455/41.2 |
| 2014/0366105 A1* | 12/2014 | Bradley | H04W 76/14 | 726/5 |
| 2015/0133056 A1* | 5/2015 | Kang | H04W 4/80 | 455/41.2 |
| 2016/0128114 A1* | 5/2016 | Moy | H04W 12/50 | 455/434 |
| 2016/0309288 A1* | 10/2016 | Helms | H04L 47/806 | |
| 2017/0358300 A1* | 12/2017 | Laurens | G06F 3/167 | |
| 2018/0091965 A1* | 3/2018 | Watson | H04W 8/005 | |
| 2018/0288208 A1* | 10/2018 | Lee | H04M 1/724092 | |
| 2019/0075385 A1* | 3/2019 | Lee | H02J 7/0045 | |
| 2020/0084532 A1* | 3/2020 | Lo | H04R 1/1016 | |
| 2020/0107184 A1* | 4/2020 | Giles | H04M 1/72412 | |
| 2020/0213705 A1* | 7/2020 | Ding | H02J 7/0045 | |
| 2021/0160955 A1* | 5/2021 | Zhong | H04R 1/1025 | |
| 2021/0289346 A1* | 9/2021 | Giles | H04W 8/22 | |
| 2021/0377663 A1* | 12/2021 | Carrigan | H04L 65/75 | |
| 2022/0201428 A1* | 6/2022 | Ertan | G06T 7/70 | |
| 2022/0248123 A1* | 8/2022 | Yang | H04R 1/1025 | |
| 2023/0228953 A1* | 7/2023 | Venkatesan | G02B 6/423 | 385/52 |
| 2024/0015496 A1* | 1/2024 | Soldano | H04W 76/14 | |
| 2025/0024243 A1 | 1/2025 | Soldano et al. | | |

FOREIGN PATENT DOCUMENTS

| | | |
|---|---|---|
| CN | 112448448 | 3/2021 |
| EP | 3300396 | 3/2018 |
| WO | WO 2019/237464 | 12/2019 |
| WO | WO 2021/017147 | 2/2021 |

OTHER PUBLICATIONS

Gupta, "Inside Bluetooth Low Energy," Artech House, 2013, 274 pages.

* cited by examiner

Identifying an enable command received from the charging case
605

Transmitting, based on the enable command, an advertisement signal that includes information related to an identification of the earbud
610

Identifying that an interval timer has elapsed
705

Identifying an earbud of a pair of earbuds
710

Transmitting, based on the interval timer, an enable command
715

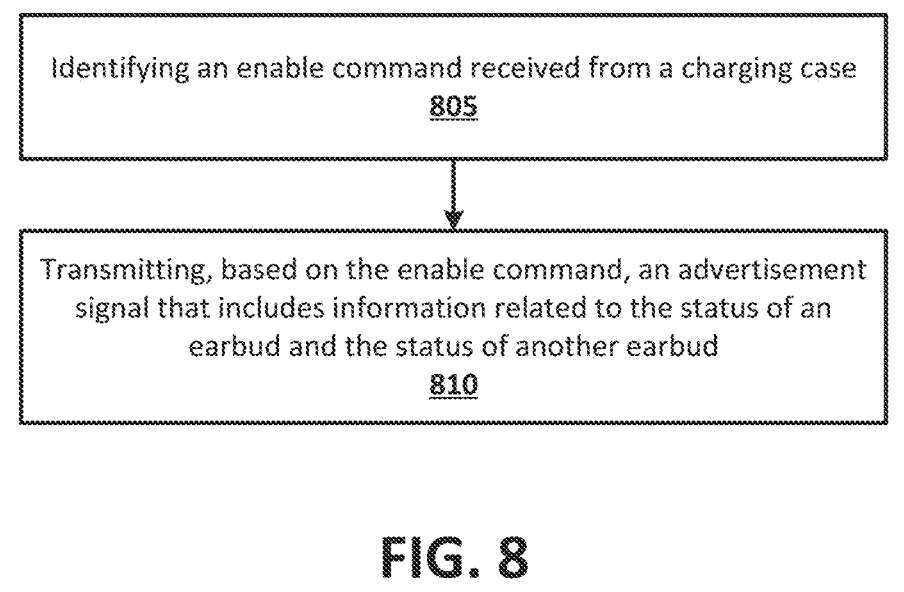

Identifying an enable command received from a charging case
805

Transmitting, based on the enable command, an advertisement signal that includes information related to the status of an earbud and the status of another earbud
810

FIG. 8

WIRELESS ACCESSORY ADVERTISEMENTS

TECHNICAL FIELD

This disclosure relates generally to transmission of advertisements from wireless devices.

BACKGROUND

Wireless accessories (e.g., wireless earbuds, headsets, headphones, etc.) may periodically transmit status advertisements to a wireless device (e.g., a personal digital assistant (PDA), mobile phone, tablet, etc.) to which they are paired when the wireless accessories are in active use (e.g., powered on and being used by a user of the wireless accessories and/or wireless device). These status advertisements may allow a user to locate the wireless accessories or monitor a status such as a battery status of the wireless accessories.

SUMMARY

Systems, methods, devices and non-transitory, computer-readable storage mediums are disclosed for status advertisements from wireless accessories such as earbuds.

In some implementations, a computer-implemented method includes identifying, by a processor of a wireless device that is coupled with a charging case, an enable command received from the charging case; and transmitting, by the processor based on the enable command, an advertisement signal that includes information related to an identification of the wireless device.

In some implementations, a computer-implemented method includes identifying, by a processor of a charging case that is coupled with one or more wireless devices, that an interval timer has elapsed; identifying, by the processor, a first wireless device from the one or more wireless devices; and transmitting, by the processor to the first wireless device based on the interval timer, an enable command to cause the first wireless device to transmit an advertisement signal related to an identification of the first wireless device.

In some implementations, a computer-implemented method includes identifying, by a processor of a wireless device that is coupled with a charging case, an enable command received from the charging case, where the wireless device is of a pair of wireless devices that includes the wireless device and another wireless device; and transmitting, by the processor responsive to identifying the enable command, an advertisement signal that includes information related to a status of the wireless device and a status of the other wireless device.

The foregoing and other embodiments can each optionally include one or more of the following features, alone or in combination. The method can include determining, by the processor, that the processor received a connection with a second wireless device; and transmitting, by the processor and to the charging case and in response at least in part to determining that the processor received the connection with the second wireless device, a wait command to cause the charging case to wait to send a disable command to the processor of the wireless device. Determining that the processor received the connection with the second wireless device can include determining, by the processor, that the processor received the connection with the second wireless device while the processor was transmitting the advertisement signal.

In some implementations, the advertisement signal can be a Bluetooth signal. The method can include identifying, by the processor, a power signal received from the charging case substantially concurrently with the transmission of the advertisement signal. The enable command can be at a first power level. The power signal can be at a second power level that is different than the first power level. The enable command can be over a first time period. The power signal can be over a second time period that is different than the first time period. The first time period can be one second. The second time period can be three seconds.

In some implementations, the method can include identifying, by the processor, a disable command received from the charging case; and stopping, by the processor, transmission of the advertisement signal based on the disable command. The method can include identifying, by the processor prior to the identification of the enable command, a wake command received from the charging case; and entering, by the processor based on the wake command, an awake operational state that causes the processor to monitor for the enable command.

In some implementations, the method can include identifying, by the processor after transmission of the advertisement signal, a sleep command received from the charging case; and entering, by the processor based on the sleep command, a sleep operational state that causes the processor to skip monitoring for the enable command. Entering the sleep operational state can cause the processor to turn off.

In some implementations, the method can include identifying, by the processor, that an advertisement duration timer elapsed; and transmitting, by the processor responsive at least in part to determining that the advertisement duration timer elapsed, a disable command to the first wireless device to cause the first wireless device to stop transmitting the advertisement signal. The method can include identifying, by the processor, that a total duration timer elapsed; and stopping, by the processor responsive at least in part to identifying that the total duration time elapsed, the interval timer and the total duration timer.

In some implementations, the one or more wireless devices can include two or more wireless devices including the first wireless device and a second wireless device. The method can include determining, by the processor, that the first wireless device and the second wireless device are not coupled; and transmitting, by the processor to the second wireless device and in response at least in part to determining that the first wireless device and the second wireless device are not coupled, a second enable command to cause the second wireless device to transmit a second advertisement signal related to a second identification of the second wireless device.

In some implementations, the method can include transmitting, by the processor to the first wireless device prior to the transmission of the enable command, a wake command to cause the first wireless device to enter an awake operational state. The method can include transmitting, by the processor to the first wireless device after transmission of the advertisement signal by the first wireless device, a sleep command to cause the first wireless device to enter a sleep operational state.

In some implementations, the one or more wireless devices can include two or more wireless devices. Identifying the first wireless device can include identifying, by the processor, power levels of respective wireless devices of the two or more wireless devices. Identifying the first wireless device can include identifying, by the processor, that the first wireless device is coupled with the charging case while another wireless device of the two or more wireless devices is not coupled with the charging case. Identifying the first wireless device can include identifying, by the processor, which wireless device of the two or more wireless devices transmitted a previous advertisement signal. The advertisement signal can include a first portion related to the status of the wireless device and a second portion related to the status of the other wireless device.

In some implementations, the first portion can have a length of one bit. The information related to the status of the wireless device can include information related to whether the wireless device is coupled with the other wireless device. The information related to the status of the other wireless device can indicate that the other wireless device is not in the charging case with the wireless device when the wireless device is not coupled with the other wireless device.

In some implementations, the information related to the status of the wireless device can include information related to whether the wireless device is coupled with the charging case. The information related to the status of the other wireless device can include information related to an identification of the other wireless device. The identification can indicate whether the other wireless device is coupled with the charging case. The information related to the status of the wireless device or the status of the other wireless device can include an indication of whether the wireless device and other wireless device are wirelessly communicatively coupled with one another.

The details of the disclosed implementations are set forth in the accompanying drawings and the description below. Other features, objects and advantages are apparent from the description, drawings and claims.

DESCRIPTION OF DRAWINGS

FIG. 8 is an alternative example technique related to wireless accessory advertisement, in accordance with various implementations.

DETAILED DESCRIPTION

As previously noted, wireless accessories, (e.g., wireless earbuds, headsets, headphones, etc.) may periodically transmit status advertisements to a wireless device (e.g., a PDA, mobile phone, tablet, etc.) to which they are paired when the wireless accessories are in active use (e.g., powered on and being used by a user of the wireless accessories and/or wireless device). These status advertisements may allow a user to locate the wireless accessories or monitor a status such as a battery status of the wireless accessories. For example, if the user has a mobile device that is communicatively coupled with the wireless accessories, then the user may be able to use the mobile device to locate, control, or monitor the wireless accessories based on the status advertisement, either through receipt of the status advertisement by the mobile device or by receipt of the status advertisement from a different mobile device that is able to then forward the received information to the mobile device of the user.

However, in some implementations the wireless accessories may not be configured to transmit such an advertisement in certain situations. Using the example of an earbud, sometimes earbuds may not be configured to transmit a status advertisement when they are located in a charging case with a closed lid. For example, in this situation the earbuds may be in a lower power or sleep mode, in which case they might not transmit the status advertisements.

Implementations herein address the above-described situations. Specifically, implementations herein relate to status advertisements that may be provided by one or more wireless accessories, e.g., earbuds, when the wireless accessories are located in a case with the lid shut, e.g., when the wireless accessories are not in active use. Such a technique may be referred to herein as an "in-case advertisement" technique. Further, in some implementations the status advertisements may include information related to both earbuds in a pair of earbuds. In some implementations, the information for each earbud may be different.

In some implementations, if the wireless accessory is composed of two physically separate parts, e.g., two earbuds, each of the earbuds may sometimes be in different locations than one another. In these implementations, it may be desirable for the status advertisement to include information related to both earbuds. The information for one earbud may be different than the information for the other earbud, e.g., because the earbuds are in different physical locations.

Figure 1:
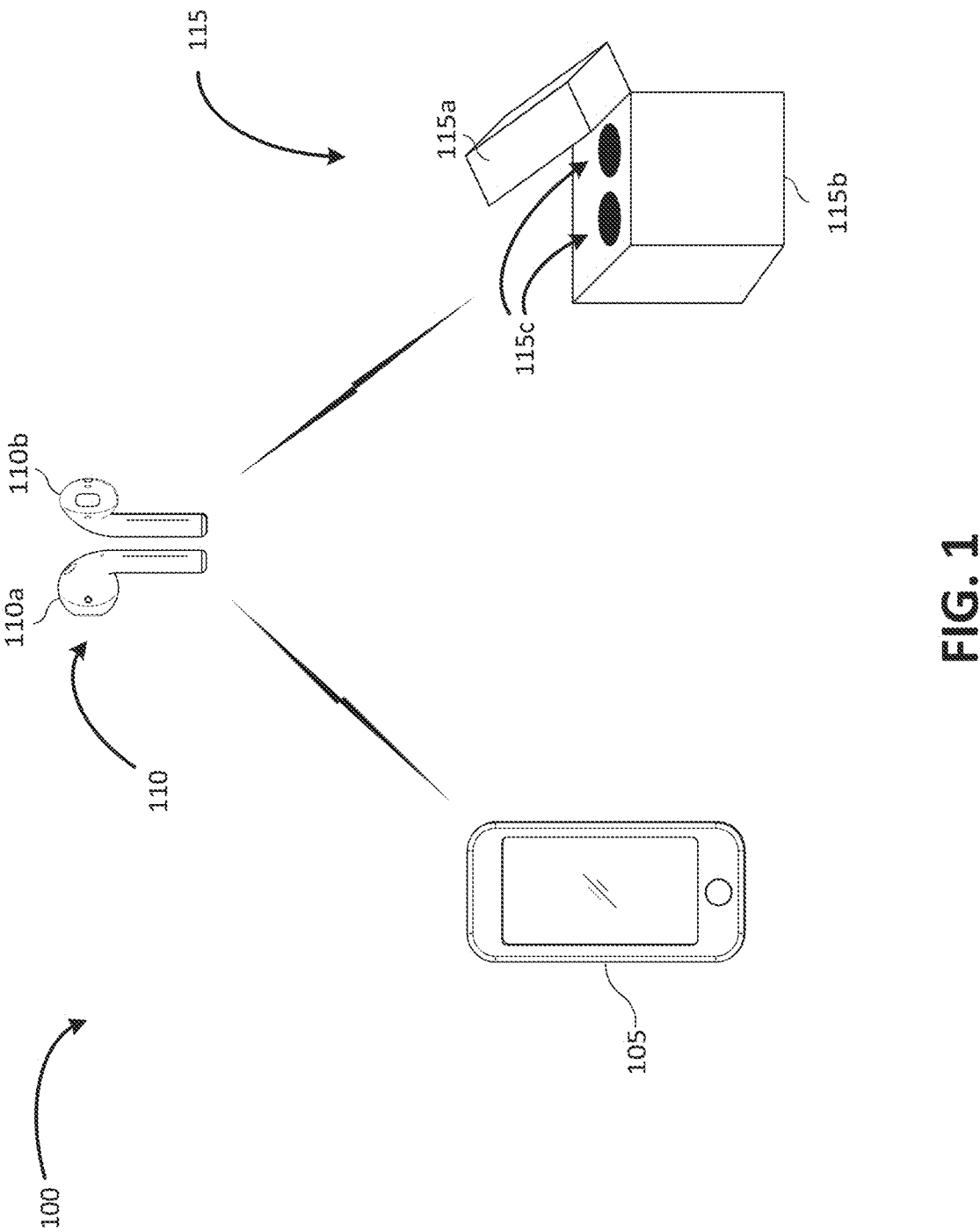
FIG. 1 is an example of a wireless system that includes a wireless accessory, in accordance with various implementations.

FIG. 1 is an example of a wireless system that includes a wireless accessory, in accordance with various implementations. System 100 includes wireless device 105, wireless accessory devices 110a and 110b, collectively, wireless accessory device 110, and a case 115 for the wireless accessory device 110.

Wireless accessory device 110 may be a device configured to communicate either directly or indirectly (e.g., through another device or computer) with a wireless device such as wireless device 105 over a wireless network or peer-to-peer communication link. Some examples of wireless accessory devices include but are not limited to wireless earbuds, headphones, headsets and other wearable devices, e.g., smartwatches, fitness bands, optical head-mounted displays, game controllers, remote controls, smartphones. In some implementations, wireless accessory device 110 can be "paired" with wireless device 105 according to, for example, a wireless technology standard, such as Bluetooth™. As can be seen, the wireless accessory device 110 may include two separate physical elements such as 110a and 110b, e.g., a left and right earbud. In some implementations, the wireless accessory device 110 can include more or fewer physical elements. For instance, the wireless accessory device can include one physical element or three or more physical elements.

Some examples of wireless networks include a wireless local area network (WLAN), such as the Internet, and a wireless personal area network (WPAN). Some examples of communication technologies include any suitable IEEE 802.xx technology, including but not limited to Wi-Fi, ultra wide band, and Bluetooth™.

Wireless device 105 may be an electronic device that is capable of communicating with a wireless accessory device 110, e.g., a device that includes a wireless transceiver chip. The wireless device 105 includes at least one microphone or other sound transducer; a display or other output device, e.g., an audio output device, for assisting a user in locating a wireless accessory device, or both. Some examples of a wireless device 105 include but are not limited to: a smartphone, a tablet computer, a notebook computer, a wearable computer, e.g., a smartwatch, and the like.

As can be seen, the case 115 may include a case body 115b, a case lid 115a, and cavities 115c in which the wireless accessory device 110 may be placed. Specifically, the case body 115b may include one or more processors, storage media, user interactive elements (e.g., a push button or user signal such as a light), etc.

The case body 115b may further include one or more contacts within the cavities 115c. In implementations, the wireless accessory device 110 may be placed within the cavities 115c such that they are physically coupled with the contacts. The contacts may supply power to, e.g., recharge, one or both of the wireless accessory devices 110a and 110b. In some implementations, the case body 115b may be configured for some other charging technique such as inductive charging. In some implementations, the case 115 may be configured to not charge the wireless accessory device 110 until the lid 115a of the case 115 is closed with the wireless accessory device 110 located in the cavities 115c.

Figure 2:
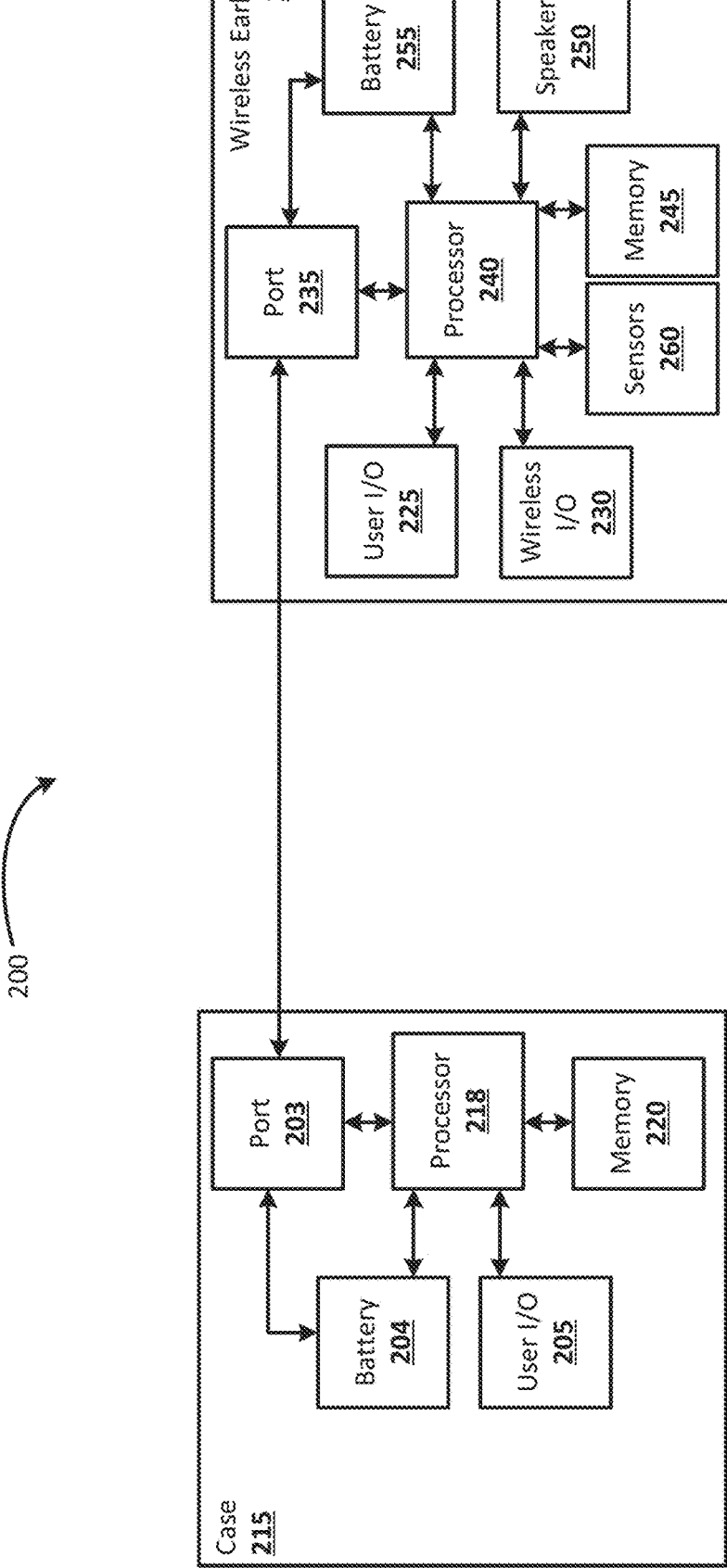
FIG. 2 is an example block diagram of a wireless system that includes a wireless accessory, in accordance with various implementations.

FIG. 2 is an example block diagram of a wireless system 200 that includes a wireless accessory, in accordance with various implementations. Specifically, in FIG. 2, and other FIGS. herein, the wireless accessory is depicted and discussed as a wireless earbud 210, which may be similar to one or both of wireless accessories 110a and 110b. However, it will be understood that the concepts herein may be applicable to other implementations wherein the wireless accessory is a headset, headphones, or some other type of wireless accessory.

Wireless earbuds 210, e.g., headphones that are positioned directly in a user's ear, may include a processor 240, a physical port 235, a user input/output (I/O) 225, a wireless I/O 230 (e.g., a wireless transceiver such as a Bluetooth™ transceiver), a memory 245, a speaker 250, a battery 255, and one or more sensors 260.

The processor 240 may be a processor such as a central processing unit (CPU), a general processing unit (GPU), one or more processor cores, an integrated circuit (IC), an application-specific IC (ASIC), or some other type of logic or controller that is operable to control the operation of the wireless earbud 210.

The port 235 may be a physical or wired connection that allows for physical coupling and exchanging of electrical signals between the wireless earbud 210 and a corresponding port 203 in or on charging case 215 when the wireless earbud 210 is physically coupled with the case 215, e.g., positioned in cavities 115c with the lid 115a closed. In implementations, the port 235 may be used for charging the wireless earbud 210 exchanging data with case 215, or both. For example, some implementations the port 235 may allow for the exchange of data between processor 240 of the wireless earbud 210 and processor 218 of the case 215. In some implementations, the port 235 may be coupled with a battery 255 of the wireless earbud 210, and be configured to receive power from the case 215 which power may then be provided to the battery 255. The battery 255 may be, for example, a lithium ion battery or some other type of battery.

The wireless I/O 230 (which may also be referred to as a wireless transceiver) may be configured to support or facilitate short range wireless communication (e.g., Bluetooth™ or some other short-range communication protocol) between the wireless earbud 210 and a wireless device such as wireless device 105. Wireless I/O or transceiver 230 enables wireless earbud 210 to communicate wirelessly with the case 215 once a channel for wireless communication has been established between the two.

Memory 245 may store firmware for operating the wireless earbud 210, as well as data for coupling with other wireless earbuds and for pairing the wireless earbud 210 with wireless mobile devices. The memory 245 may be, for example, a non-volatile memory (NVM), a flash memory, or some other type or kind of memory.

In some implementations, the wireless earbud 210 may further include one or more speakers 250, which may be configured to produce a sound. Specifically, the speaker 250 may be configured to play back audio such as music, podcasts, voice communications, or some other type of audio. In some implementations, the earbud 210 may include a single speaker 250, whereas in other implementations the earbud 210 may include various speakers tuned to different frequencies (e.g., a midrange speaker, a tweeter, and a lower frequency range speaker).

The wireless earbud 210 may further include a user I/O 225. The user I/O 225 may include one or more elements for user input such as buttons, switches, knobs, etc. The user I/O 225 may further include one or more user output elements such as a light, haptic feedback, or some other type of output element.

The wireless earbud 210 may further include one or more sensors 260 such as an accelerometer or in-ear sensor which are configured to identify a location, orientation, or movement of the wireless earbud 210.

The wireless system 200 may further include a case 215, which may be similar to case 115 of FIG. 1. In other implementations, the case 215 may be a docking station, or some other type of accessory or electronic device. The case 215 may include a port 203, a battery 204, a processor 218, a user I/O 205, and a memory 220, which may be respectively similar to port 235, battery 255, processor 240, user I/O 225, and memory 245.

Figure 3:
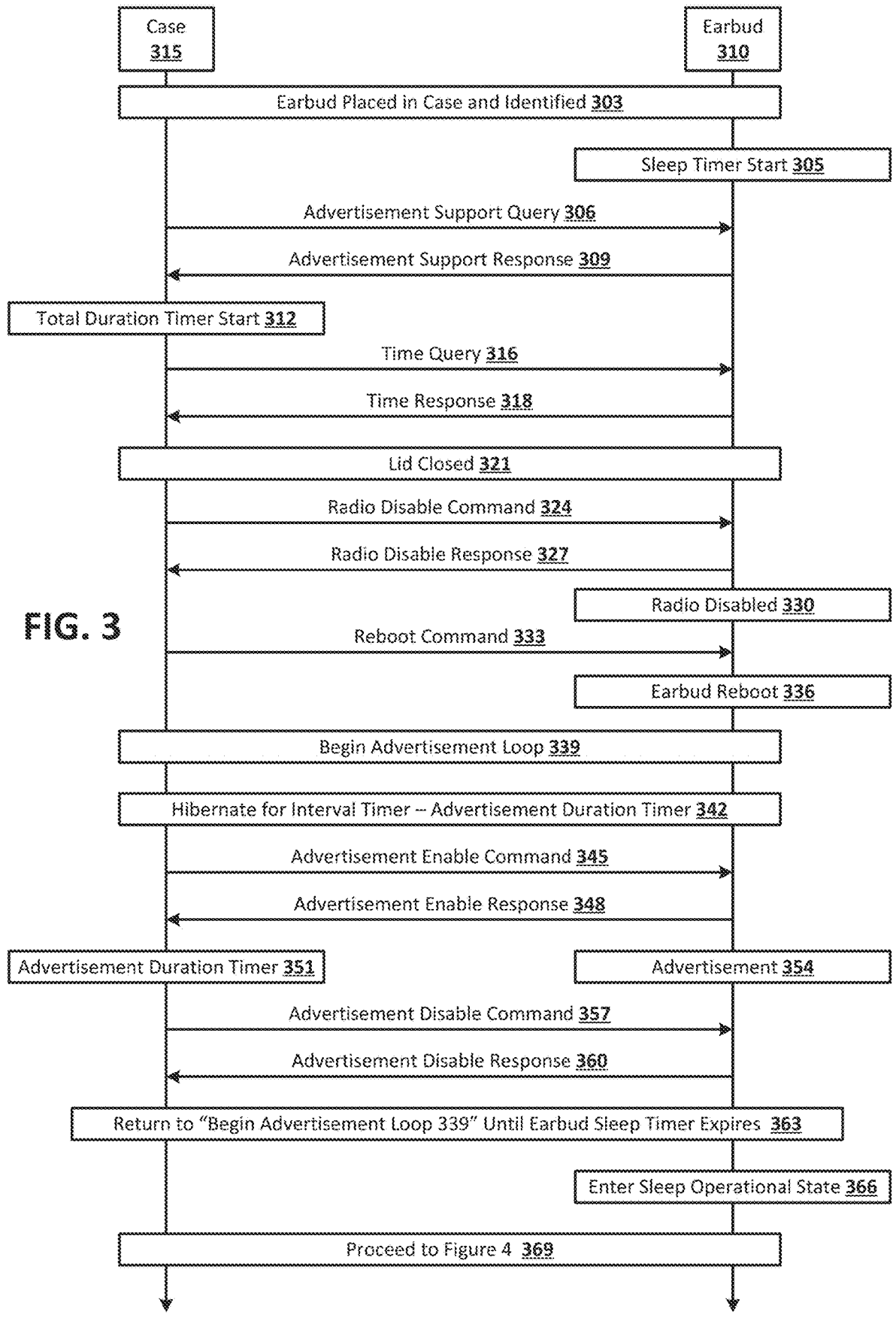
FIG. 3 is an example of a process flow for wireless accessory advertisement, in accordance with various implementations.

FIG. 3 is an example of a process flow for wireless accessory advertisement, in accordance with various implementations. Specifically, the process flow depicts communication between a case 315 and an earbud 310, which may be respectively similar to case 115 or 215 and wireless accessory 110a or wireless earbud 210. The communication may be performed by signal that are passing between, for example, ports 203 and 235. The communication may facilitate in-case advertisement from the earbud 310.

The process flow begins at 303 when the earbud 310 is placed into the case 315 and identified by the case 315. For example, the earbud 310 may be placed into one of cavities 115c. In some implementations, the earbud 310 may be coupled with the case 315 in another manner. The case 315 may identify the earbud 310 for use in the in-case advertisement technique based on a number of factors. For example, the earbud 310 may be identified based on the order it was put into the case 315, e.g., the first or last earbud 310 to be put into the case 315 is always selected. In some implementations, the earbud 310 may be identified based on which earbud of the earbud pair previously participated in the in-case advertisement technique, e.g., if the "left" earbud previously performed in-case advertisement, then the "right" earbud may be selected, or vice-versa. In some implementations, the earbud 310 may be identified based on respectively power levels of both earbuds of a pair of earbuds, e.g., the earbud with the highest power can be selected. Other criteria may be present in other implementations.

A sleep timer is then started at 305. Specifically, as shown in FIG. 3, the sleep timer may be started by a processor such as processor 240 of the wireless earbud 310. Generally, the sleep timer may be a timer that is indicates how long the earbud 310 should remain in the case 315 in an awake operation state before the earbud enters a sleep operational state. The sleep operational state may be defined by characteristics such as reduced power consumption, extended time between processor activity, reduced signaling, or a combination of these. It will be noted that, although the sleep timer start at 305 is depicted as an activity of the earbud 310, in some implementations the sleep timer may additionally or alternatively be run, monitored, or maintained by the case 315, e.g., a processor such as processor 218.

The case 315 may then transmit an advertisement support query at 306. Specifically, the advertisement support query may be a message that queries whether the earbud 310 supports an in-case advertisement technique as described herein. The earbud 310 may respond with an advertisement support response 309 that includes a bit or some other indicator that the earbud 310 supports the advertisement technique described herein, e.g., the in-case advertisement technique.

Upon confirmation by the case that the earbud 310 supports the in-case advertisement technique, the case 315 may start, at 312, a total duration timer. The total duration timer may be a timer that indicates a total length of the in-case advertisement technique before the earbud 310 is instructed to not perform further advertisements. In some implementations, the total duration timer may have a length of between approximately sixteen hours and six months, specifically sixteen and twenty-four hours, more specifically twenty-four hours.

The case 315 may then send a time query at 316 to the earbud 310. The time query may be, for example, a query to coordinate the internal clocks of both the case 315 and the earbud 310, for example by aligning both clocks to coordinated universal time (UTC) or some other time. In some implementations, the time query may include an indication of the internal clock of the case 315. In some implementations, the time query may include a request for the earbud 310 to provide an indication of its internal clock. In response, the earbud 310 provides a time response at 318 which may acknowledge the information provided by the case 315 and/or include an indication of the internal clock of the earbud 310.

The lid (e.g., lid 115a) of the case 315 may be closed, which may initiate a power-down procedure for the earbud 310. The power-down procedure may be a procedure by which the operational of the state of the earbud 310 is changed to a reduced-power operational state. In this reduced-power operational state, the earbud 310 may, for example, use less power, recharge the battery of the earbud 310 from the battery of the case, or a combination of these.

Specifically, when the lid is closed at 321, the case 315 may transmit a radio disable command at 324 to the earbud 310. The radio disable command may be a command that is to cause the earbud 310 to power down, turn off, or otherwise cease operation of an internal radio of the earbud such as the wireless I/O 230. The earbud 310 may respond with a radio disable response 327 which may include, for example, an acknowledgment of the radio disable command at 324. The radio of the earbud is then disabled at 330.

The case may then transmit a reboot command at 333 to the earbud 310. The reboot command may be a command that is to cause the earbud 310 to reboot itself at 336, for example by power cycling. Such a reboot may, for example, clear various temporary data of the earbud (e.g., some cryptographic keys), clear a cache of the earbud, or both.

The wireless system may then begin an advertisement loop at 339. Generally, the advertisement loop at 339 may be the loop wherein the earbud 310 performs in-case advertisement.

The case 315, and/or the earbud 310, may additionally start an interval timer. Generally, it may be desirable for the in-case advertisement to occur periodically according to a predictable schedule. The interval timer may refer to a timer that indicates how often the in-case advertisement should occur. In some implementations, the interval timer may be, for example, on the order of one minute, however it will be understood that in other implementations the interval timer may be longer or shorter dependent on factors such as battery life, specific use case, etc.

Initially, the advertisement loop may include hibernating, at 342, for a specific time. As depicted in FIG. 3, the specific time is the difference between the interval timer as discussed above and an advertisement duration timer. The advertisement duration timer may refer to a timer that monitors how long a status advertisement should occur for. In some implementations, the advertisement duration timer may be approximately three seconds long, while in other implementations the advertisement duration may be longer or shorter dependent again on factors such as battery life, specific use case, etc. In some implementations, the hibernation may further take into account the time required for the advertisement enable procedures described at 345 and 348, the advertisement disable procedures described at 357 and 360, described in more detail below, or both.

At the end of the hibernation, the case 315 may send an advertisement enable command at 345. The advertisement enable command may be, for example, a one-second long power pulse that is transmitted to the earbud 310. In some implementations, the advertisement enable command may be a set bit in a message that is provided by the case 315 to the earbud 310, or some other command. The earbud 310 may identify the advertisement enable command and send an advertisement enable response 348 that acknowledges receipt of the command at 345.

Based on the advertisement enable command 354, the earbud 310 may transmit a status advertisement at 354. The status advertisement may include information such as the location of the earbud 310, an identifier of the earbud 310, the power level of the earbud 310, some other status indicator of the earbud 310, or a combination of two or more of these.

In some implementations, when the earbud 310 transmits the status advertisement at 354, an accompanying device, e.g., a wireless device such as a smart phone or smart watch, can transmit information about the earbud 310. For instance, the accompanying device can transmit data that indicates the location of the earbud 310, some other status indicator of the earbud 310, or both. The accompanying device can transmit data that was not included in the status advertisement.

Substantially concurrently with the advertisement at 354, the case 315 may monitor the advertisement duration timer at 351. As noted above, the advertisement duration timer at 351 may be approximately three seconds long. It will be understood that in some implementations, not shown, the earbud 310 may additionally or alternatively monitor the advertisement duration timer.

Upon expiry of the advertisement duration timer at 351, the case 315 may send an advertisement disable command at 357, which may include an indication, either in terms of a specific power level, a specific bit, or some other indication, that the earbud 310 is to stop advertisement. Based on the command at 357, the earbud 310 may transmit an advertisement disable response at 360 which acknowledges the disable command at 357.

The process flow then loops, at 363, back to element 339 until the sleep timer started at 305 expires. In some implementations, when the process flow loops at 363 back to 339, the earbud used to transmit the status advertisement at 354 may switch, while in other implementations the same earbud may be used for two or more consecutive loops.

Upon expiry of the sleep timer, the earbud 310 may enter a sleep operational state at 366. In the sleep operational state, one or more processes or elements of the earbud 310 may be further powered down such that it draws less power, e.g., turns off, monitors for signals at longer periodic intervals, or both. The process may then continue to FIG. 4 at 369.

In some implementations, a wireless device, e.g., the wireless device 105, can send a signal to the earbud 310 when the earbud 310 is transmitting the advertisement signal. This can occur when the wireless device is trying to determine a location of the earbud 310, to send audio content to the earbud 310, or both.

When the earbud 310 receives a signal from a wireless device, e.g., while the earbud 310 is transmitting the advertisement signal, the earbud 310 can transmit a signal to the charging case 315 that indicates that the charting case should wait to send the disable command to the earbud 310. For instance, the earbud 310 can monitor for signals from, e.g., connections with, devices. This monitoring can occur when the earbud 310 is transmitting the advertisement signal. In response to determining that the earbud received a connection with a wireless device, the earbud 310 can send a wait command to the charging case 315 to cause the charging case 315 to wait to send the disable command to the earbud 310.

The earbud 310 can send a stop waiting command to the charging case 315 after a predetermined period of time, when the connection with the wireless device is terminated, or at another appropriate time. Receipt of the stop waiting command can cause the charging case 315 to continue its prior operation, e.g., to continue any timers that were paused based on receipt of the wait command. This can enable the wireless device to determine the location, e.g., an approximate location, of the earbud 310 when more time is necessary than the charging case 315 would otherwise normally allow, e.g., when a user of the wireless device needs to find the earbud 310 and the wireless device only provides direction information for the user to determine the location of the earbud 310.

Figure 4:
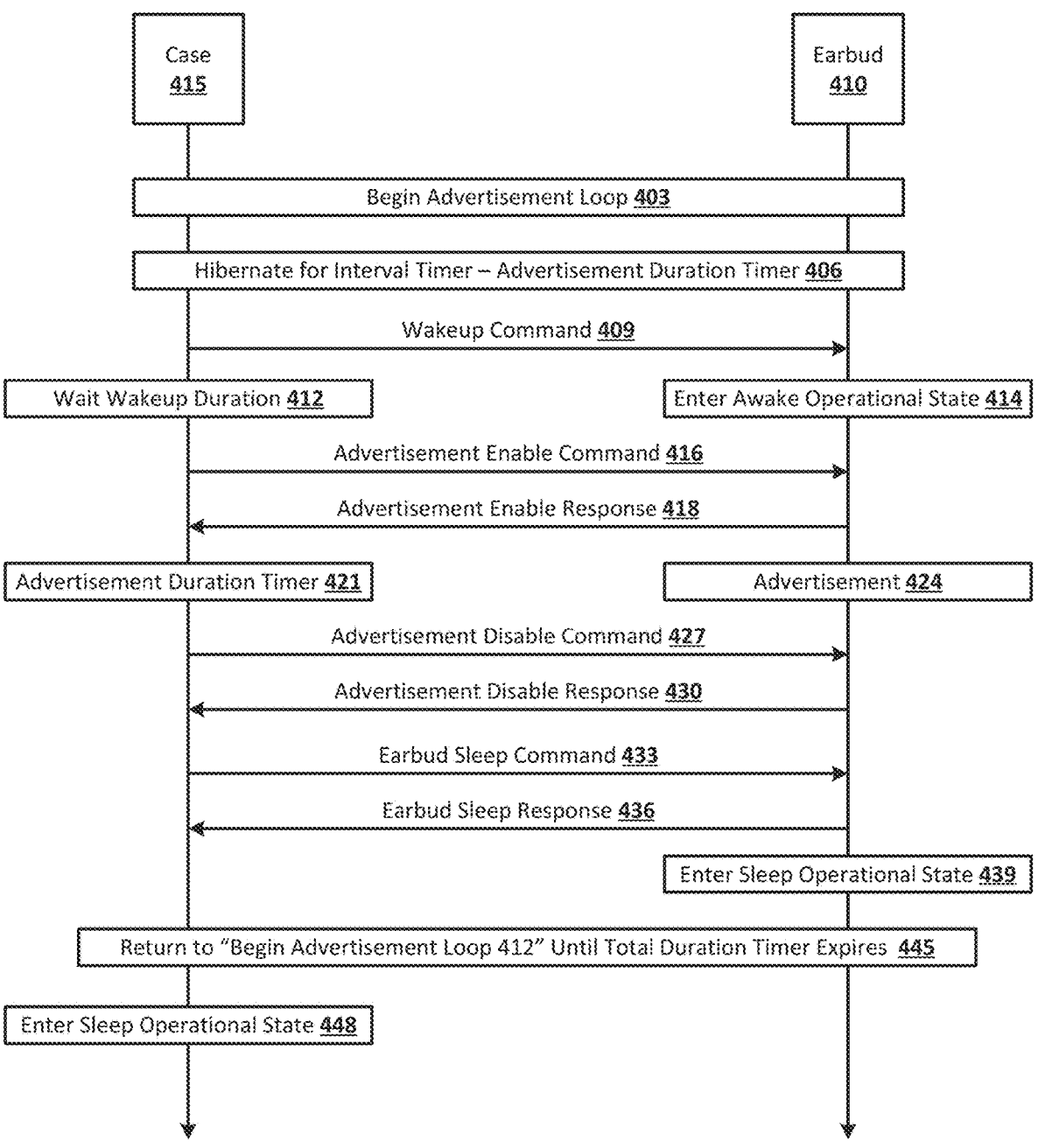
FIG. 4 is a continued example of the process flow of FIG. 3, in accordance with various implementations.

FIG. 4 is a continued example of the process flow of FIG. 3, in accordance with various implementations. Specifically, FIG. 4 depicts a process flow that can be considered a continuation of the process flow of FIG. 3 once the earbud enters the sleep operational state at 366.

FIG. 4 is depicted with respect to a case 415 and an earbud 410, which may be similar to case 315 and earbud 310 of FIG. 3. The process flow may begin with the start of an advertisement loop at 403, and then hibernation at 406, which may be respectively similar to elements 339 and 342 of FIG. 3.

Subsequent to the hibernation at 406, the case 415 may transmit a wakeup command at 409 to the earbud 410. The wakeup command at 409 may be a command that causes the earbud 410 to exit the sleep operational state and enter an awake operational state. The awake operational state may be an operational state in which the earbud 410 is configured to transmit, receive, monitor, or a combination of these, for one or more wireless signals such as the status advertisement. The case 415 may then wait for the duration of the earbud's 410 wakeup procedure at 412, while the earbud enters the awake operational state at 414.

The process flow may then include elements 416, 418, 421, 424, 427, and 430 as depicted in FIG. 4, which may be respectively similar to elements 345, 348, 351, 354, 357, and 360 as discussed above. These elements will not be reiterated for the sake of lack of redundancy in this discussion.

Subsequent to the advertisement disablement at 427 and 430, the case 415 may send a sleep command to the earbud at 410, which is acknowledged in a response at 436. The sleep command may be a command that causes the earbud to enter the sleep operational state at 439, which is similar to element 366 as described above.

The process flow may then return to element 412 until the total duration timer, which was started at element 312, expires at 445. Once the total duration timer expires at 445, then the case 415 may likewise enter the sleep operational state 448, and direct the earbud to not continue periodic status advertisements. In this manner, the case 415 and/or the earbud 410 may not deplete their respective batteries or needlessly power cycle due to status advertisements.

It will be understood that the descriptions of FIGS. 3 and 4 are intended as one example, and other implementations may vary. For example, certain elements may occur in a different order than depicted (e.g., with the order reversed or occurring concurrently). In some implementations, elements that are described as being transmitted or initiated by the case 315/415 may be initiated by the earbud 310/410 and acknowledged by the case, or vice-versa.

In some implementations, the described timers, e.g., the interval timer, the advertisement duration timer, the total duration timer, the sleep timer, etc., may be initiated at a different point than depicted in the process flow, or may be different than described above. For example, the "advertisement enable command 345" may be a one-second long pulse as described below with respect to FIG. 5. Therefore, in this implementation the hibernation at 342 may be for the difference between the interval timer and [advertisement duration timer+one second]. In some implementations, this additional one-second time interval may be built into, or otherwise be a part of, either the interval timer or the advertisement duration timer. Similarly, the timers may be modified to account for the wakeup command at 409. Generally, it will be understood that the exact organizational structure of the process flow may vary in different implementations, and the examples of FIGS. 3 and 4 are intended as high level examples of concepts described herein. Other variations may be present in other implementations.

Figure 5:
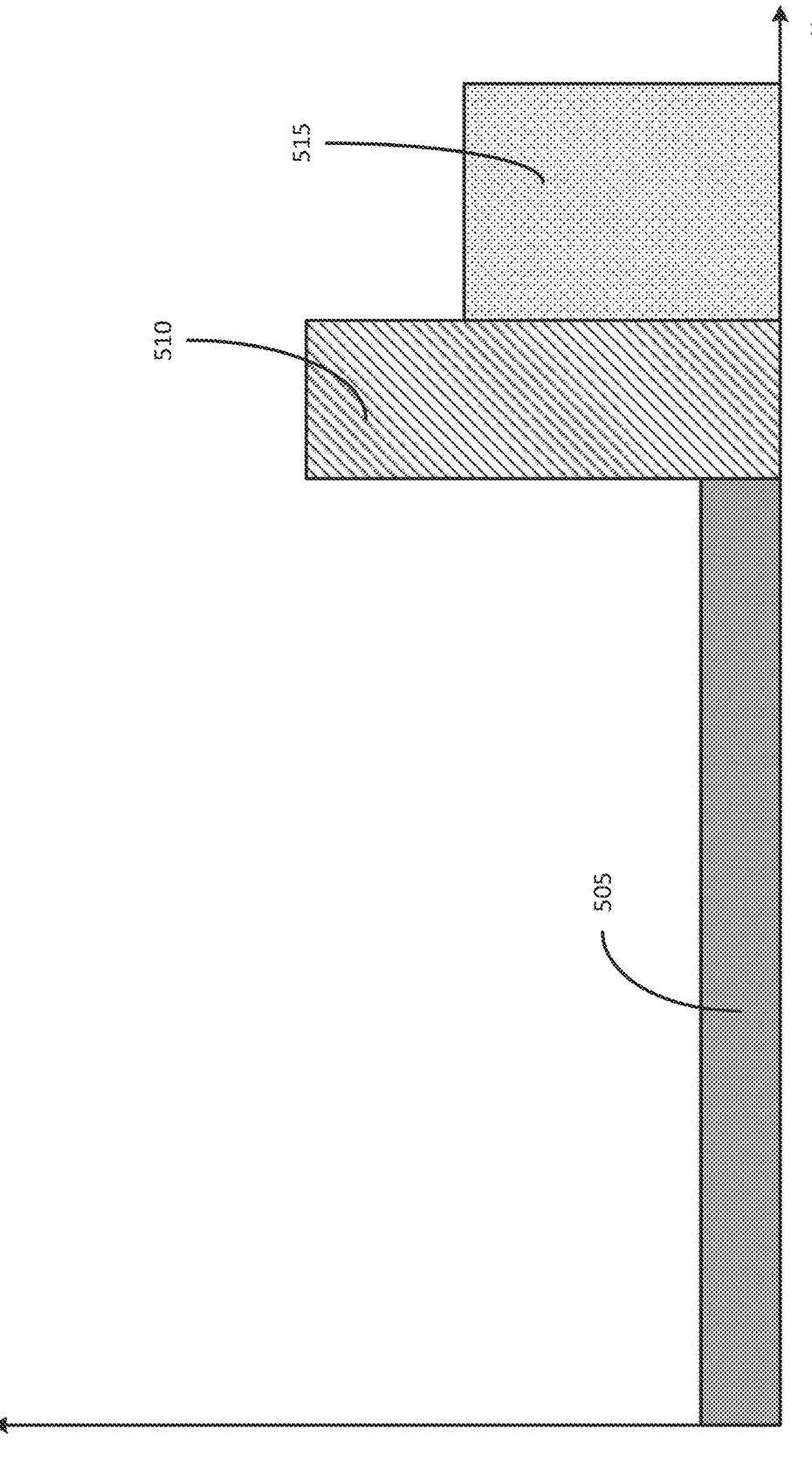
FIG. 5 depicts an example of power use of a wireless accessory during advertisement, in accordance with various implementations.

FIG. 5 depicts an example of power use of a wireless accessory (e.g., an earbud such as earbuds 310 or 410) during the advertisement loop, in accordance with various implementations. Specifically, the X axis of FIG. 5 depicts time, and the Y axis depicts level of power. It will be understood that FIG. 5 is for the purpose of discussion only, and is not intended to be drawn to scale.

For the purposes of this discussion, it is assumed that the advertisement loop cycles every minute. That is, interval timer is one minute long. Similarly, it is assumed that the status advertisement from the earbud is approximately three seconds long. That is, advertisement duration timer is three seconds long.

As may be seen in FIG. 5, the earbud may be at a relatively low power at 505. For example, the earbud may be drawing approximately 30 microWatts (μW) from the case. This power draw may be for the purpose of maintaining or recharging the earbud's battery. Generally, this stage may coincide with the hibernation described at 342 and 406, can last for approximately 56 seconds, or both.

The case may then provide, at 510, the advertisement enable command described at 345 or 416. Generally, the command may take the form of a relatively higher-power pulse that is supplied from the case 315/415 to the earbud 310/410. In some implementations, the command at 510 may last approximately one second, have a power of approximately 25 milliwatts (mW), or both, although in other implementations the duration and/or power of the command may be larger or smaller than described. During the wakeup enable command at 510, earbud charging may be disabled.

The earbud 310/410 may then perform, at 515, status advertisement as described at 354 or 424. The advertisement may last for approximately 3 seconds, e.g., the duration of the advertisement duration timer. In some implementations, the advertisement may take the form of a single transmission. In some implementations the advertisement may take the form of repeated periodic transmissions during a predetermined, e.g., three second, interval. Subsequent to the status advertisement at 515, the process may then loop as described above with respect to elements 363 or 445.

As previously noted, in some implementations the status advertisement may only be transmitted by a single earbud of one or more, e.g., a pair of, earbuds. However, the two earbuds in a group of two or more, e.g., a pair, may have different statuses than one another. For example, in some implementations one earbud (e.g., wireless accessory 110a) may be in the case (e.g., case 115), while the other earbud (e.g., wireless accessory 110b) might not be in the case. In some implementations, the earbuds may be communicatively coupled with one another. In some implementations the earbuds might not be communicatively coupled with one another. In some implementations, the lid of the case (e.g., lid 115a) may be open. In some implementations the lid may be closed.

It may be desirable for the status advertisement to be able to indicate one or more permutations of the above-described situation. Table 1, below, describes an example of information which may be included in a status advertisement. In this example, the status advertisement may be represented by two bits. In this example, it may be presumed that the status advertisement is being transmitted by a left earbud. A first bit, Bit-0, may include information related to the right earbud. A second bit, Bit-1, may include information related to the status of the transmitting, e.g., left, earbud. Specifically, Bit-1 may include information related to whether the transmitting earbud is within the case.

It will be understood that Table 1, below, is intended to show how the different bits may be set in different scenarios. However, Table 1 is not intended to show the relative positions of bits within a transmission. In other words, Bit-0 may occur before Bit-1 in the transmission, or vice-versa. In some implementations, the relative locations of Bits 0 and 1 may be based on factors such as which earbud is transmitting the status advertisement.

TABLE 1

| Status Advertisement Scenario | | |
|---|---|---|
| | Bit-0 | Bit-1 |
| Both earbuds are in-case | 1 | 1 |
| Left earbud in-case, right earbud out of case, lid closed, earbuds are not communicatively coupled with one another | 0 | 1 |
| Left earbud in-case, right earbud out of case, lid open, earbuds are communicatively coupled with one another | 1 | 1 |
| Both earbuds are out of case, earbuds are communicatively coupled with one another | 1 | 0 |
| Both earbuds are out of case, earbuds are not communicatively coupled with one another | 0 | 0 |
| Left earbud in-case, right earbud in another case, lid closed, earbuds are not communicatively coupled with one another | 0 | 1 |
| Left earbud in-case, right earbud in another case, lid open, earbuds are communicatively coupled with one another | 1 | 1 |
| Left earbud in-case, right earbud in another case, lid open, earbuds are not communicatively coupled with one another | 0 | 1 |

Figure 6:
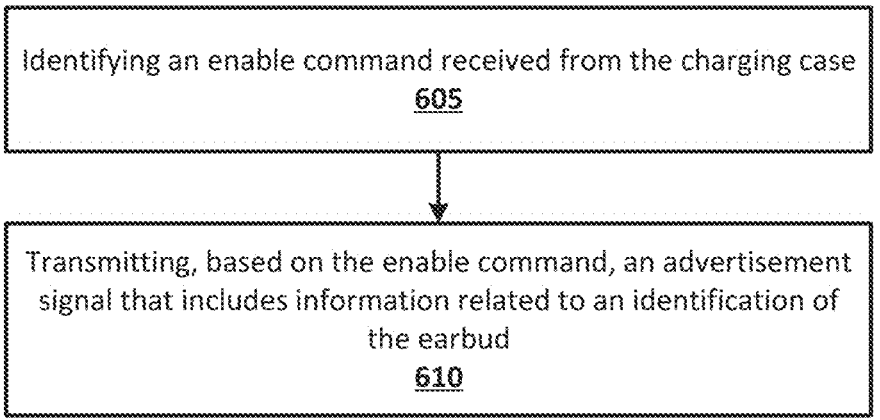
FIG. 6 is an example technique related to wireless accessory advertisement, in accordance with various implementations.

FIG. 6 is an example technique related to wireless accessory advertisement, in accordance with various implementations. Specifically, the technique is a technique which may be performed by a wireless accessory such as wireless earbud 210/310/410 and, more specifically, processor 240 of wireless earbud 210.

The technique may include identifying, at 605, an enable command received from a charging case such as case 215. The enable command may be, for example, the advertisement enable command discussed with respect to elements 345 or 416. The technique further includes transmitting, at 610 based on the enable command, an advertisement signal that includes information related to an identification of the earbud. The advertisement signal may be, for example, the status advertisement discussed above with respect to elements 354 or 424, or Table 1.

Figure 7:
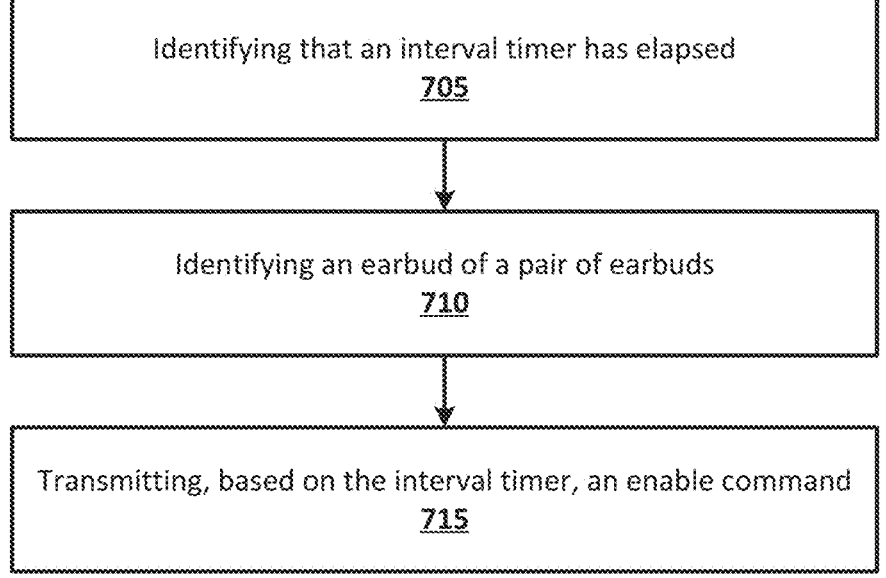
FIG. 7 is an alternative example technique related to wireless accessory advertisement, in accordance with various implementations.

FIG. 7 is an alternative example technique related to wireless accessory advertisement, in accordance with various implementations. Specifically, the technique is a technique which may be performed by a case such as cases 215/315/415 and, more specifically, processor 218 of case 215.

The technique may include identifying, at 705, that an interval timer has elapsed. The interval timer may be the interval timer described above with respect to, for example, elements 342 or 406, or FIG. 5. The technique may further include identifying, at 710, an earbud of one or more, e.g., a pair of, earbuds. As noted with respect to element 303, identification of the earbud may be based on one or more factors such as respective power levels of the earbuds, which earbud was placed into the case first, which earbud was last used to transmit a status advertisement, etc. The technique may further include transmitting, at 715, based on the interval timer, an enable command to the identified earbud. Specifically, the enable command may be the advertisement enable command described with respect to elements 345 or 416, and may be configured to cause the earbud to transmit an advertisement signal related to an identification of the earbud.

In some implementations, a case can receive two earbuds that are not communicatively coupled. Coupled earbuds can be earbuds that were sold as a set, that normally play back audio together, that can communicate directly with each other, e.g., without another device assisting in the communication, or a combination of two or more of these. This can occur when two people with similar pairs of earbuds accidently grab one earbud from each of the two pairs.

In these implementations, the technique can further include determining that the first earbud and the second earbud are not coupled. The case can perform this determination when two earbuds are placed in the case or at any other appropriate time. In response at least in part to determining that the first earbud and the second earbud are not coupled, the case can transmit a similar enable command to the other earbud. For instance, the case can transmit, to the second earbud, a second enable command to cause the second earbud to transmit a second advertisement signal related to a second identification of the second earbud. The second enable command can be the same command as the enable command sent to the first earbud.

FIG. 8 is another example technique related to wireless accessory advertisement, in accordance with various implementations. Specifically, the technique is a technique which may be performed by a wireless accessory such as wireless earbud 210/310/410 and, more specifically, processor 240 of wireless earbud 210.

The technique includes identifying, at 805, an enable command received from a charging case (e.g., charging case 215, 315, or 415). The enable command may be, for example, the advertisement enable command discussed with respect to elements 345 or 416. The technique further includes transmitting, at 810 based on the enable command, an advertisement signal that includes information related to a status of the earbud, the status of another earbud, or both. The advertisement signal may be, for example, the status advertisement discussed above with respect to elements 354 or 424, or Table 1.

In some implementations, the advertisement signal can indicate whether the earbud is still coupled with the other earbud. For instance, the two earbuds might no longer be coupled when the other earbud does not have power, e.g., the other earbud's battery is drained; when the other earbud is more than a threshold distance from the earbud; or a combination of these.

The earbud can determine some or all of the information related to the status of the earbud, the status of the other earbud, or both. For instance, when the earbud is not coupled to the other earbud, the earbud can determine whether the earbud is coupled with the other earbud. The earbud can determine, as the status for the other earbud, information that indicates that the other earbud is or is not coupled with the earbud. For instance, the earbud can determine information related to the status of the other earbud that indicates that the other earbud is not in the charging case with the earbud when the earbud is not coupled with the other earbud.

It will be understood that the example techniques of FIGS. 6, 7, and 8 are intended as high level example techniques. Other implementations may have more or fewer elements, elements in a different order than depicted, etc. Other variations may be present in other implementations.

Figure 9:
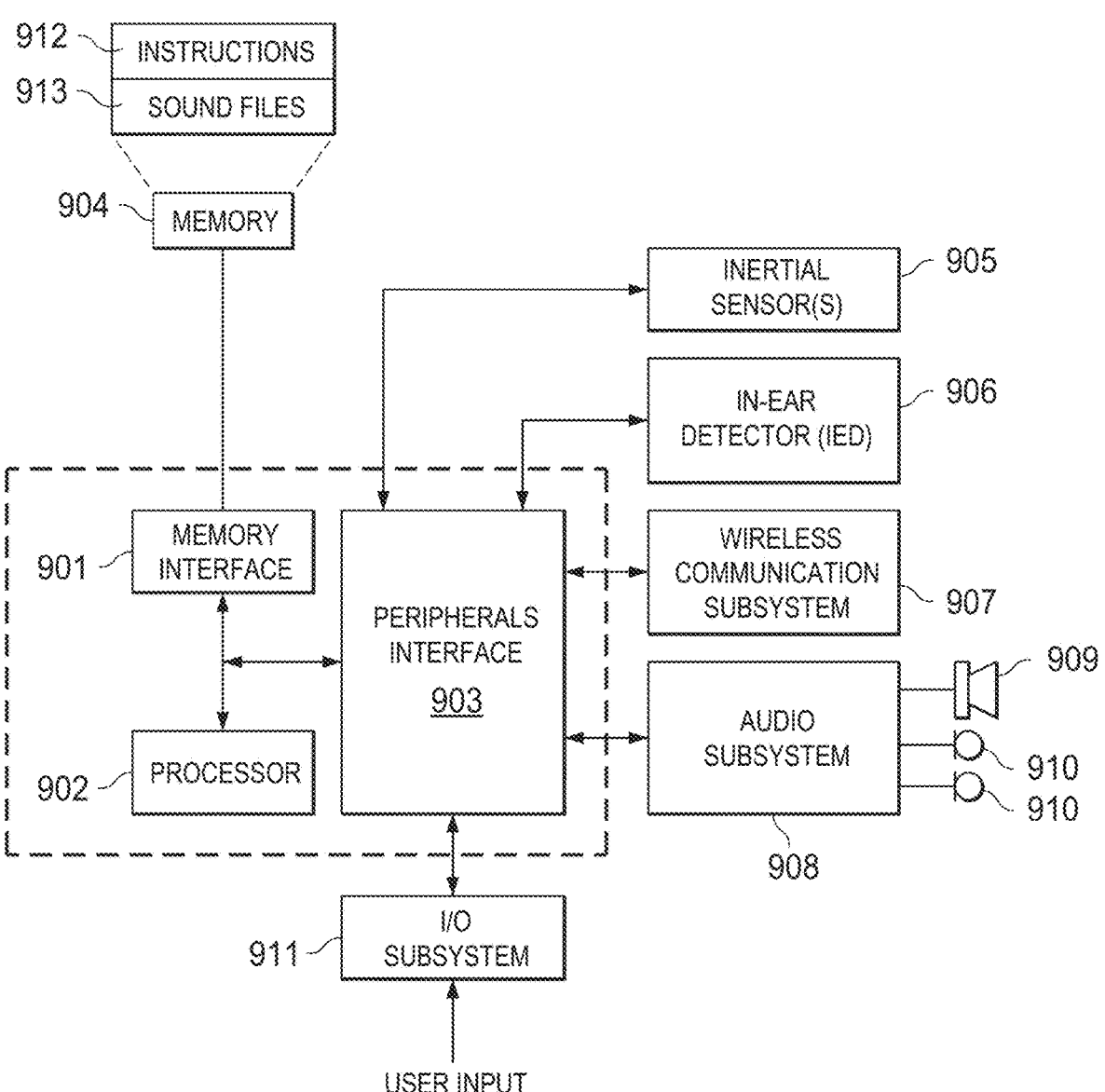
FIG. 9 is an example block diagram of wireless accessory architecture, in accordance with various implementations.

FIG. 9 is a wireless accessory device architecture, according to an implementation. Generally, FIG. 9 may be a wireless earbud, and is intended to supplement the depiction of the wireless earbud 210 of FIG. 2. In other words, the architecture 900 may be, or may be an element of, the wireless earbud 210 of FIG. 2

Architecture 900 includes memory interface 901, processor 902 (which may be similar to processor 240), peripherals interface 903, memory 904 (which may be similar to memory 245), one or more inertial sensors 905, in-ear detector (IED) 906, wireless communication subsystem 907 (which may be similar to wireless I/O 230), audio subsystem 908, one or more speakers 909 (which may be similar to speaker 250), one or more microphones 910 and input/output (I/O) subsystem 911 (which may be similar to user I/O 225). The inertial sensor(s) 905 and IED 906 may be similar to sensors 260. Memory further includes instructions 912 and sound file(s) 913. Memory interface 901, processor 902 and/or peripherals interface 903 may be separate components or may be integrated in one or more integrated circuits. Other accessory devices, such as smartwatches may include an on-wrist detector (OWD) (that uses an optical or proximity sensor, for example) instead of an IED. One or more communication buses or signal lines may couple the various components.

Sensors, devices, and subsystems may be coupled to peripherals interface 903 to facilitate multiple functionalities. For example, inertial sensor(s) 905 and IED 906 may be coupled to peripherals interface 903 to facilitate orientation and proximity functions of the accessory device. In some implementations, inertial sensors 905 (e.g., an accelerometer, rate gyroscope) may be utilized to detect movement and orientation of the accessory device. For example, if the accessory device is an earbud, headphone or headset, a multi-axis accelerometer can be used to identify head gestures. Also, the accelerometer can be configured to detect vibrations due to user input (e.g., tapping on the accessory device) to activate or deactivate the accessory device or perform another function. Other sensors may also be connected to peripheral interfaced 903, such as a magnetometer, temperature sensor, a barometer or a biometric sensor to facilitate related functionalities. For example, a biometric sensor can be used for authentication and/or to monitor heart rate and/or other fitness parameters. IED 906 can include an optical sensor, proximity switch, biometric sensor or any other suitable sensor for detecting when the accessory device is placed in or proximate to a user's ear.

Communication functions may be facilitated through wireless communication subsystem 907. Wireless communication subsystem 907 may include a radio frequency (RF) transceiver for short range, peer-to-peer communication with a mobile device or another earbud as described in reference to FIGS. 1-8. The specific design and implementation of the wireless communication subsystem 907 may depend on the communication network(s) or medium(s) over which the device is intended to operate. For example, the wireless communication subsystem 907 may facilitate communication over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystem 907 may include a software stack for implementing wireless communication protocols.

Audio subsystem 908 may be coupled to one or more loudspeakers 909 and one or more microphones 911 to facilitate voice-enabled functions, such as voice recognition, voice replication, digital recording, and telephony functions, and to perform processes or enable features as described in reference to FIGS. 1-8.

I/O subsystem 911 may include a touch controller and/or another input controller. The touch controller may be coupled to a touch surface. The touch surface and touch controller may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface. Other input controllers may be coupled to other input/control devices, such as one or more buttons, rocker switches or thumb-wheel. The one or more buttons may include an up/down button for volume control of speaker(s) 909 and/or microphones 911. In some implementations, the accessory device may play recorded audio files (e.g., sound files or audio messages), such as MP3, AAC, and MPEG video files. In some implementations, the accessory device may include the functionality of an audio player (e.g., MP3 player).

Memory interface 901 may be coupled to memory 904. Memory 904 may include high-speed random-access memory or non-volatile memory, such as one or more magnetic disk storage devices, one or more optical storage devices, or flash memory (e.g., NAND, NOR). Memory 904 may store instructions 912 and sound file(s) 913. Instructions can include operating system instructions for handling basic system services and for performing hardware dependent tasks. Instructions 912 can facilitate communicating with one or more additional devices, one or more computers or servers, including peer-to-peer communications with a mobile device, a case, or another earbud as described in reference to FIGS. 1-8. Instructions 912 can facilitate graphical user interface (GUI) processing, inertial sensor processing and IED processing. Instructions 912 can respond to signals or commands from a companion device to play sound file 913 with increasing levels of loudness to a maximum loudness but not exceeding a maximum loudness allowed by government regulations. Memory 904 may include additional instructions or fewer instructions. The various functions of the accessory device may be implemented in hardware and/or in software, including in one or more signal processing and/or ASICs.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer.

Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs. To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

Various operations may be described as multiple discrete operations in turn, in a manner that is most helpful in understanding the claimed subject matter. However, the order of description should not be construed as to imply that these operations are necessarily order dependent.

Any of the above-described examples may be combined with any other example (or combination of examples), unless explicitly stated otherwise. The foregoing description of one or more implementations provides illustration and description, but is not intended to be exhaustive or to limit the scope of implementations to the precise form disclosed. Modifications and variations are possible in light of the above teachings or may be acquired from practice of various implementations.

Although the implementations above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method comprising:

identifying, by a processor of a wireless device that is communicatively coupled with a charging case and that has transmission of one or more advertisement signals disabled, an enable command received from the charging case and that indicates that the one or more advertisement signals should be enabled;

generating, by the processor based on the enable command, an advertisement signal that includes information related to an identification of the wireless device;

identifying, by the processor after generation of the advertisement signal, a sleep command received from the charging case; and entering, by the processor based on the sleep command, a sleep operational state that causes the processor to skip monitoring for the enable command.

2. The method of claim 1, further comprising:

determining, by the processor, that the processor received a connection with a second wireless device; and generating, by the processor and for transmission to the charging case and in response at least in part to determining that the processor received the connection with the second wireless device, a wait command to cause the charging case to wait to send a disable command to the processor of the wireless device.

3. The method of claim 2, wherein determining that the processor received the connection with the second wireless device comprises determining, by the processor, that the processor received the connection with the second wireless device while the advertisement signal was transmitted.

4. The method of claim 1, further comprising identifying, by the processor, a power signal received from the charging case substantially concurrently with the transmission of the advertisement signal.

5. The method of claim 1, further comprising:

identifying, by the processor, a disable command received from the charging case; and generating, by the processor, a stop command for a transceiver included in the wireless device that causes the transceiver to stop transmission of the advertisement signal based on the disable command.

6. The method of claim 1, further comprising:

identifying, by the processor prior to the identification of the enable command, a wake command received from the charging case; and entering, by the processor based on the wake command, an awake operational state that causes the processor to monitor for the enable command.

7. A method comprising:

identifying, by a processor of a charging case that is communicatively coupled with one or more wireless devices, that an interval timer has elapsed;

identifying, by the processor, a first wireless device from the one or more wireless devices and that has transmission of one or more advertisement signals disabled; and generating, by the processor for transmission to the first wireless device and based on identifying that the interval timer has elapsed, an enable command that indicates that the one or more advertisement signals should be enabled and that, when received by the first wireless device, causes the first wireless device to transmit an advertisement signal related to an identification of the first wireless device.

8. The method of claim 7, further comprising:

identifying, by the processor, that an advertisement duration timer elapsed; and generating, by the processor responsive at least in part to identifying that the advertisement duration timer elapsed, a disable command for transmission to the first wireless device to cause the first wireless device to stop transmitting the advertisement signal.

9. The method of claim 8, further comprising:

identifying, by the processor, that a total duration timer elapsed; and stopping, by the processor responsive at least in part to identifying that the total duration time elapsed, the interval timer and the total duration timer.

10. The method of claim 7, wherein:

the one or more wireless devices comprise two or more wireless devices including the first wireless device and a second wireless device, the method further comprising:

determining, by the processor, that the first wireless device and the second wireless device are not coupled; and generating, by the processor and in response at least in part to determining that the first wireless device and the second wireless device are not coupled, a second enable command for transmission to the second wireless device to cause the second wireless device to transmit a second advertisement signal related to a second identification of the second wireless device.

11. The method of claim 7, wherein:

the one or more wireless devices comprise two or more wireless devices; and identifying the first wireless device comprises identifying, by the processor, power levels of respective wireless devices of the two or more wireless devices.

12. The method of claim 7, wherein:

the one or more wireless devices comprise two or more wireless devices; and identifying the first wireless device comprises identifying, by the processor, that the first wireless device is coupled with the charging case while another wireless device of the two or more wireless devices is not coupled with the charging case.

13. The method of claim 7, wherein:

the one or more wireless devices comprise two or more wireless devices; and identifying the first wireless device comprises identifying, by the processor, which wireless device of the two or more wireless devices transmitted a previous advertisement signal.

14. A method comprising:

identifying, by a processor of a first wireless device of a pair of wireless devices and that is communicatively coupled with a charging case and that has transmission of one or more advertisement signals disabled, an enable command received from the charging case and that indicates that the one or more advertisement signals should be enabled, wherein the pair of wireless devices includes the first wireless device and a second wireless device; and generating, by the processor responsive to identifying the enable command, an advertisement signal that includes information related to a status of the first wireless device and a status of the second wireless device.

15. The method of claim 14, wherein the advertisement signal includes a first portion related to the status of the first wireless device and a second portion related to the status of the second wireless device.

16. The method of claim 14, wherein the information related to the status of the first wireless device includes information related to whether the first wireless device is coupled with the second wireless device.

17. The method of claim 14, wherein the information related to the status of the first wireless device includes information related to whether the first wireless device is coupled with the charging case.

18. The method of claim 14, wherein the information related to the status of the second wireless device includes information related to an identification of the second wireless device.

19. The method of claim 14, wherein the information related to the status of the first wireless device or the status of the second wireless device includes an indication of whether the first wireless device and second wireless device are wirelessly communicatively coupled with one another.

20. The method of claim 14, further comprising:

identifying, by the processor prior to the identification of the enable command, a wake command received from the charging case; and entering, by the processor based on the wake command, an awake operational state that causes the processor to monitor for the enable command.

\* \* \* \* \*